US012693723B2

(12) United States Patent
Wang et al.

(10) Patent No.: US 12,693,723 B2
(45) Date of Patent: Jul. 28, 2026

(54) SYNCHRONOUS POWER STATE CONTROL SCHEME FOR MULTI-CHIP INTEGRATED POWER MANAGEMENT SOLUTION IN EMBEDDED SYSTEMS

(71) Applicant: Texas Instruments Incorporated, Dallas, TX (US)

(72) Inventors: Pauline Poyun Wang, Richardson, TX (US); Juha Tapani Pennanen, Oulu (FI)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/663,655

(22) Filed: May 14, 2024

(65) Prior Publication Data

US 2024/0295911 A1 Sep. 5, 2024

Related U.S. Application Data

(60) Division of application No. 17/334,239, filed on May 28, 2021, now Pat. No. 12,019,493, which is a
(Continued)

(51) Int. Cl.
*G06F 1/3206* (2019.01)
*G06F 1/26* (2006.01)
(Continued)

(52) U.S. Cl.
CPC ............ *G06F 1/3206* (2013.01); *G06F 1/263* (2013.01); *G06F 1/3215* (2013.01); *G06F 1/3243* (2013.01); *Y02D 10/00* (2018.01)

(58) Field of Classification Search
CPC ... G06F 1/26; G06F 1/263; G06F 1/28; G06F 1/3206; G06F 1/3215; G06F 1/3243;
(Continued)

(56) References Cited

U.S. PATENT DOCUMENTS 9,407,264 B1 8/2016 Ali et al.
9,914,548 B1 3/2018 Vadillo
(Continued)

FOREIGN PATENT DOCUMENTS

CN 202267913 U 6/2012

OTHER PUBLICATIONS

"MIPI SPMI System Power Management Interface" 2012. MIPI Alliance (Year: 2012).
(Continued)

*Primary Examiner* — Thomas J. Cleary
(74) *Attorney, Agent, or Firm* — Michelle Murray; Frank D. Cimino

(57) ABSTRACT

Methods and apparatus for power management of embedded devices are provided. An example apparatus includes a primary power management integrated circuit (PMIC) to communicate with an embedded system to determine a power state. The example primary PMIC is to include a first power state sequence controller and a first power supply controller. The example first power state sequence controller is to drive a first power supply controller according to the power state. The example first power supply controller is to activate a first set of rails to apply power to the embedded system. The example apparatus includes a secondary PMIC including a second power state sequence controller and a second power supply controller. The example second power sequence controller is to drive a second power supply controller according to the power state. The example second power supply controller is to activate a second set of rails to apply power to the embedded system.

20 Claims, 9 Drawing Sheets

Related U.S. Application Data continuation of application No. 16/023,726, filed on Jun. 29, 2018, now Pat. No. 11,054,878.

(60) Provisional application No. 62/612,050, filed on Dec. 29, 2017, provisional application No. 62/551,463, filed on Aug. 29, 2017.

(51) Int. Cl.
G06F 1/3215 (2019.01)
G06F 1/3234 (2019.01)

(58) Field of Classification Search
CPC ............. G06F 11/0703; G06F 11/0736; G06F 11/0796; Y02D 10/00
See application file for complete search history.

(56) References Cited

U.S. PATENT DOCUMENTS

| | | | | |
|---|---|---|---|---|
| 10,673,256 | B2 * | 6/2020 | Li | ............................... H02J 7/02 |
| 10,936,049 | B2 | 3/2021 | Mocanu et al. | |
| 11,579,675 | B2 * | 2/2023 | Hutchings | ............... G06F 1/266 |
| 2004/0227404 | A1 | 11/2004 | Boros et al. | |
| 2005/0180065 | A1 * | 8/2005 | Chapuis | .................... G06F 1/26 |
| | | | | 361/18 |
| 2005/0198601 | A1 * | 9/2005 | Kuang | .................... G06F 30/33 |
| | | | | 716/108 |
| 2006/0085654 | A1 | 4/2006 | Nokkonen | |
| 2006/0117192 | A1 | 6/2006 | Nokkonen | |
| 2006/0212138 | A1 | 9/2006 | Zhang | |
| 2006/0225060 | A1 | 10/2006 | Goyan | |
| 2006/0288246 | A1 | 12/2006 | Huynh | |
| 2008/0043819 | A1 | 2/2008 | Li et al. | |
| 2008/0178031 | A1 | 7/2008 | Kim | |
| 2008/0273475 | A1 * | 11/2008 | Priyantha | .............. G06F 13/385 |
| | | | | 370/257 |
| 2008/0276110 | A1 | 11/2008 | Indiani et al. | |
| 2011/0022859 | A1 | 1/2011 | More et al. | |
| 2011/0057724 | A1 * | 3/2011 | Pabon | ................... H02M 7/219 |
| | | | | 307/31 |
| 2012/0256659 | A1 * | 10/2012 | Kiadeh | ............... H02M 3/1584 |
| | | | | 327/108 |
| 2013/0181528 | A1 * | 7/2013 | Colombi | ................. H02J 9/062 |
| | | | | 307/65 |
| 2014/0097818 | A1 | 4/2014 | Wiktor et al. | |
| 2014/0277590 | A1 | 9/2014 | Brown | |
| 2015/0212154 | A1 | 7/2015 | Krishnani et al. | |
| 2016/0209905 | A1 | 7/2016 | Kelly et al. | |
| 2016/0239060 | A1 | 8/2016 | Koob et al. | |
| 2016/0306417 | A1 * | 10/2016 | Greig | ..................... B64D 11/06 |
| 2016/0336745 | A1 * | 11/2016 | Pandya | ................... H02J 7/342 |
| 2016/0352101 | A1 * | 12/2016 | Koo | ........................... H02J 1/12 |
| 2016/0357245 | A1 | 12/2016 | Heo et al. | |
| 2017/0141608 | A1 * | 5/2017 | Stenger | ................. H02J 7/0045 |
| 2017/0153680 | A1 | 6/2017 | Girard et al. | |
| 2017/0237266 | A1 * | 8/2017 | Hatakeyama | ............. H02J 3/00 |
| | | | | 307/24 |
| 2017/0358947 | A1 * | 12/2017 | Waters | .................... H02J 13/00 |
| 2018/0004276 | A1 | 1/2018 | Wong et al. | |
| 2018/0052791 | A1 | 2/2018 | Srivastava et al. | |
| 2018/0120910 | A1 * | 5/2018 | Farkas | ...................... G06F 1/26 |
| 2018/0210535 | A1 | 7/2018 | Varkki et al. | |
| 2018/0323626 | A1 * | 11/2018 | Suen | ....................... B60L 1/006 |
| 2018/0329837 | A1 | 11/2018 | Mishra et al. | |
| 2019/0105724 | A1 * | 4/2019 | Kawai | ............. G01R 19/16528 |
| 2020/0091811 | A1 * | 3/2020 | Wang | .................... G06F 1/3296 |

OTHER PUBLICATIONS

International Search Report for Application No. PCT/US 2018/048578, dated Dec. 13, 2018.
Machine translation for CN202267913U.

\* cited by examiner

SYNCHRONOUS POWER STATE CONTROL SCHEME FOR MULTI-CHIP INTEGRATED POWER MANAGEMENT SOLUTION IN EMBEDDED SYSTEMS

CROSS-REFERENCE TO RELATED APPLICATIONS

This application is a division of U.S. patent application Ser. No. 17/334,239, filed May 28, 2021, which is a continuation of U.S. patent application Ser. No. 16/023,726, filed Jun. 29, 2018, now U.S. Pat. No. 11,054,878, issued Jul. 6, 2021, which claims the benefit of and priority to U.S. Provisional Patent Application No. 62/612,050, filed Dec. 29, 2017, and U.S. Provisional Patent Application No. 62/551,463, filed Aug. 29, 2017, all of which are hereby incorporated herein by reference in their entireties.

TECHNICAL FIELD

This disclosure relates generally to power control and, more particularly, to power control for integrated power management in embedded systems.

BACKGROUND

Some embedded electronic devices involve an external power supply to drive an embedded processor and other connected circuitry. Industrial, personal electronics, automotive applications, and/or other embedded solutions can benefit from power management. Power management integrated circuits are integrated circuits or blocks on a system-on-a-chip device that manage power requirements of a host system, such as the system-on-a-chip and/or other embedded device. A power management integrated circuit includes power conversion and/or power control functionality to drive a device such as a mobile phone, portable media player, automotive and/or industrial device, etc., to reduce space involved in power supply and management.

SUMMARY

Certain examples provide an apparatus for power management of embedded devices are provided. The example apparatus includes a primary power management integrated circuit to communicate with an embedded system to determine a power state. The example primary power management integrated circuit is to include a first power state sequence controller and a first power supply controller. The example first power state sequence controller is to drive a first power supply controller according to the power state. The example first power supply controller is to activate a first set of rails to apply power to the embedded system. The example apparatus includes a secondary power management integrated circuit including a second power state sequence controller and a second power supply controller. The example second power sequence controller is to drive a second power supply controller according to the power state determined by the primary power management integrated circuit. The example second power supply controller is to activate a second set of rails to apply power to the embedded system. The example apparatus includes an inter-power management integrated circuit interface to connect the primary power management integrated circuit and the secondary power management integrated circuit to enable exchange of information related to the power state between the primary power management integrated circuit and the secondary power management integrated circuit including an input from the primary power management integrated circuit specifying the power state to the secondary power management integrated circuit to control the secondary power management integrated circuit to operate with the primary power management integrated circuit according to the power state to apply power to the embedded system.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1B:
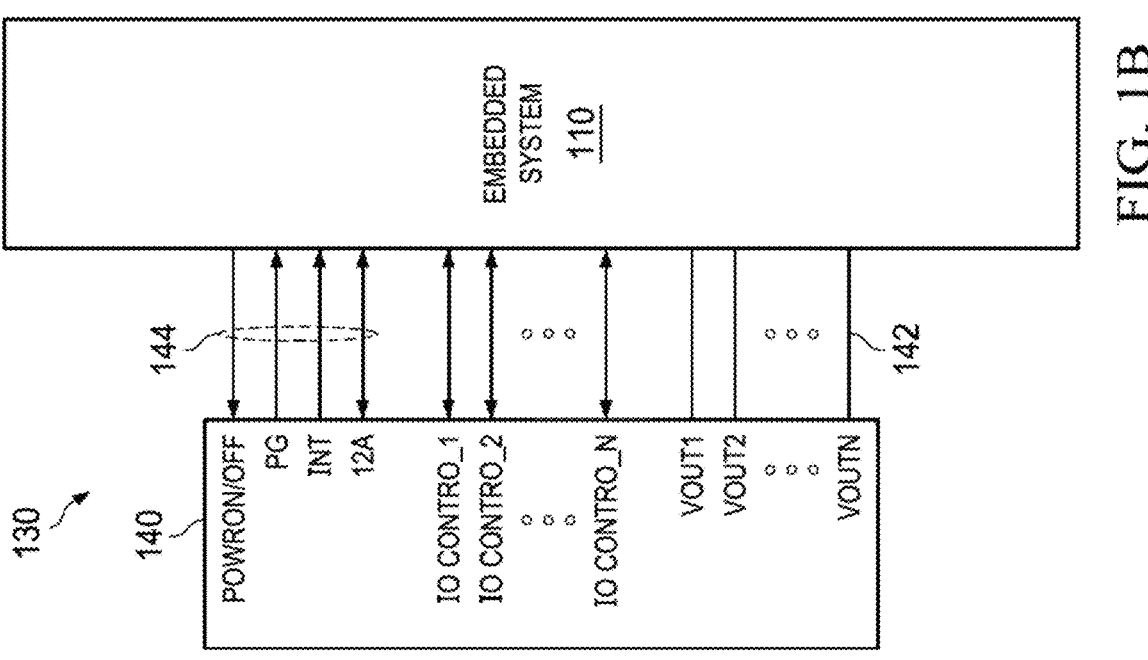
FIGS. 1A-1C are schematic illustrations of example power management configurations for an embedded system.

Some electronic devices, such as embedded systems, have particular power requirements. With expanded complexity and power demands for microcontroller-centric embedded systems, power management integrated circuits (PMICs) are a preferred power supply solution due to smaller bill of material (BOM) in terms of both footprint and number of devices, as well as reduced number of input/output (I/O) pins between an embedded system (e.g., a system on a chip or SoC), etc., and the PMIC to respond to changing system state. PMICs also provide programmability of output voltages, finite state machine (FSM) controlled power sequencing, and other efficiently, operability, and controllability benefits, for example.

However, an integrated PMIC also has disadvantages when the circuit is too large. For example, an increased footprint size creates layout challenges, external component placement congestion, thermal density challenges, and increased complexity of the PMIC design, which leads to higher cost. Further, if a simpler variant of the system does not require all the power rails (or power levels) from the PMIC, this functionality is unused but adds to system cost and area because all power rails are present.

When PMIC size reaches a limit, multiple PMICs are required to power a large embedded system. This allows spreading heat load over a larger area, and external component placement is easier. Power can be placed near loads in different parts of system, and a number of power rails can be adjusted by adding/removing individual PMICs as needed for high-end, mid- and low-end configurations. However, the number of I/O pins between the SoC and the PMICs increases if all signals are routed to each PMIC. Further, power rail sequencing is hard to program across multiple PMICs when complex multi-rail power sequences are required.

In certain examples, an SoC/other circuit system may be powered by more than a dozen power rails. Such systems have numerous operating power states and very complex sequences between them which have to be timed accurately. The power state diagram of a general system can be presented according to a set of power states (e.g., 1-N), transitions between power states, conditions which trigger transitions between states, possible error conditions, and procedures/sequences in case of error condition to maintain safe operation of the system. An amount of information to represent full details of an associated state diagram is very large, and methods such as linking a power good (PGOOD) status indication to an enable (EN) pin may not necessarily be able to implement all required state transitions.

Powering microcontroller-centric embedded systems with an expandable number of power rails that involve synchronized power sequencing when going between various power states currently needs a great number of I/O or Interface channels to accomplish. Some solutions may be asynchronous and prone to timing errors and system instability. However, certain examples described herein provide a solution which enables a scalable multi-chip integrated power management device to power a microcontroller-centric embedded system with a synchronized power sequencer. Certain examples described herein provide a synchronous power sequencer with improved timing control and scalability to enable convenience for system expansion. Certain examples provide a synchronous FSM control scheme across multiple integrated power management chips and/or other circuits while reducing hardware complexity and cost and providing scalability for expansion. Certain examples described herein include a feedback mechanism for improved operation and safety. Certain examples described herein provide a master-slave control scheme with centralized communication between the master of a multi-chip integrated power solution and a microprocessor of the embedded system.

Such embedded systems can benefit from improved power supply control in automotive and industrial applications involving scalable power management using multiple PMICs, as well as embedded systems with functional safety requirements, for example. In certain examples, PMICs with pre-programmed power sequences are assigned to each power state of the system. In some examples, a master PMIC broadcasts only power state information to associated slave PMICs. A viable interface channel is provided between the PMICs with error checking to enable PMICs to switch to the same power state simultaneously (or substantially simultaneously given signal transmission and/or processing latency, etc.).

Thus, certain examples described herein provide simplified communication between multiple PMICs which enables high speed synchronization to system state changes and fast reaction to fault conditions. Certain examples enable a reduction of system hardware changes with scalable variants of the embedded system. Certain examples help facilitate reduction or elimination of complicated control software programs between a processor and each power rail in the system. Certain examples build in error checking in a protocol to enable the system to achieve a higher safety goal.

Figure 1A:
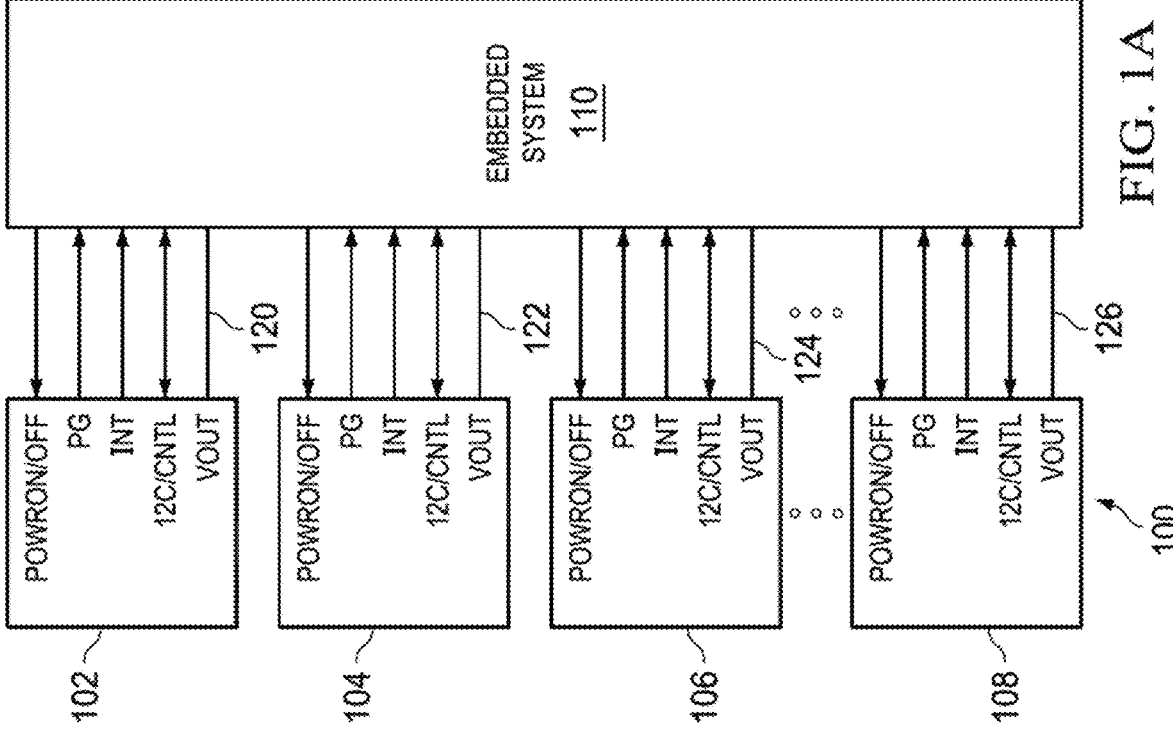

As shown in the example of FIG. 1A, a discrete solution for a system 100 includes a plurality of PMICs 102-108 connected to an embedded system 110. Each PMIC 102-108 has its own control signals interacting with the embedded system 110 including its own output voltage (Vout) 120-126 powering part of the embedded system 110. In contrast, FIG. 1B provides an integrated PMIC solution 130 including a single PMIC 140 connected to the embedded system 110. The single PMIC 140 provides a plurality of output voltages 142 with only a single set of control inputs 144.

Figure 1C:
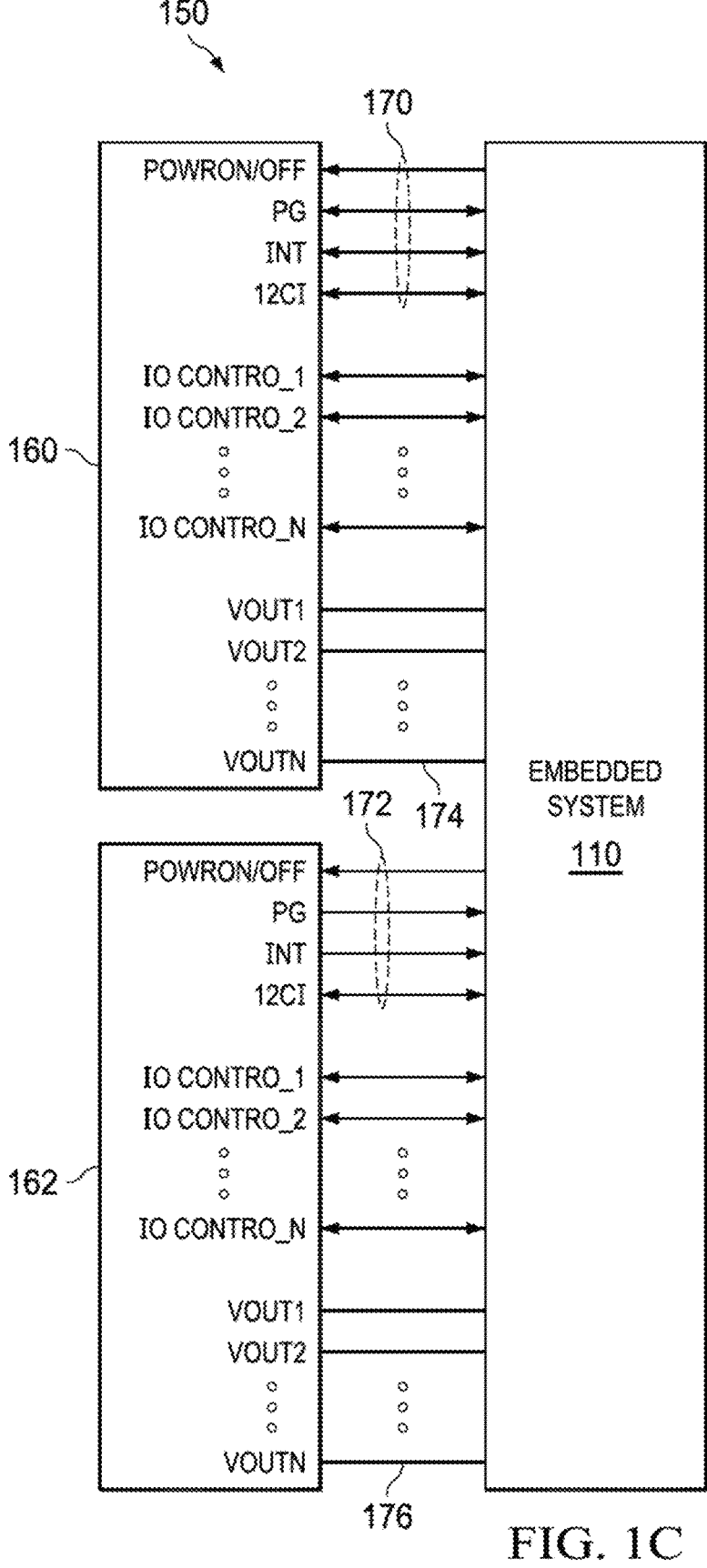

FIG. 1C illustrates an example multiple integrated PMIC solution 150 with a plurality of PMICs 160, 162 connected to the embedded system 110. Each PMIC 160, 162 includes a set of control inputs 170, 172, and a voltage output (Vout) 174, 176 to power the embedded system 110. Thus, when the PMIC size reaches a limit, multiple PMICs 160, 162 are used to power a large embedded system 110 and spread the heat load over a larger area. Power can be placed near loads in different parts of the embedded system 110, and power rails can be adjusted by adding and/or removing PMICs 160, 162 for high-, mid-, and low-end configurations, for example. However, a number of I/O pins between the embedded system 110 (e.g., a system on a chip, etc.) and the PMICs 160, 162 increases if all signals are routed to each IC 160, 162. Further, power rail sequencing is hard to program across multiple PMICs 160, 162 with complex multi-rail power sequences.

Figure 2:
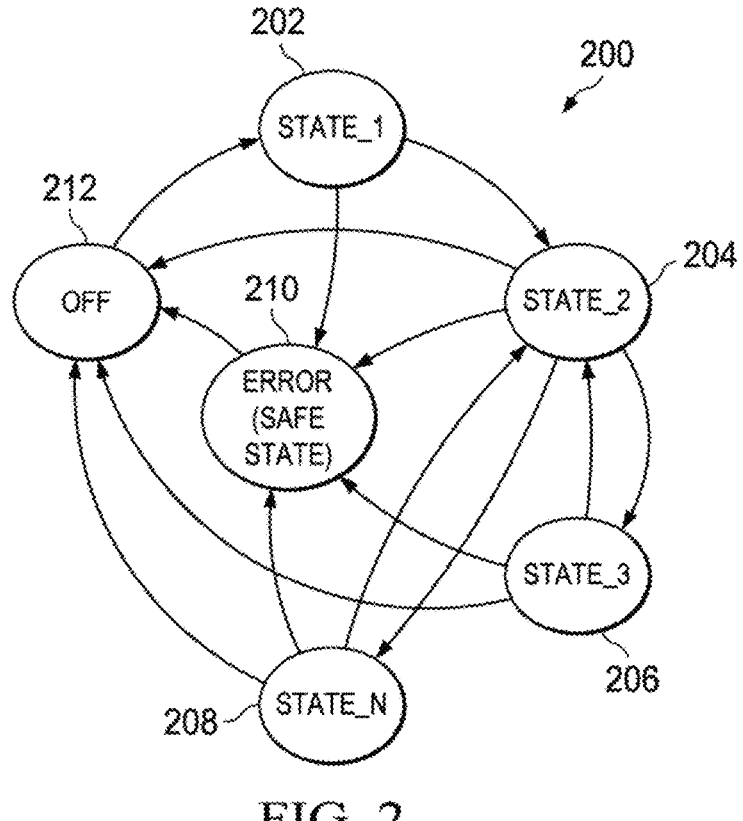
FIG. 2 is an example power state sequence diagram.

FIG. 2 is an example state diagram 200 (e.g., a finite state machine) indicating a set of power states 1-N and transitions between the power states. Certain conditions trigger transitions between states. For example, a first state 202 has certain exit condition(s) specified by a signal list, internal condition list, etc., to transition from the first state 202 to a second state 204. From the second state 204, a first exit condition, specified by a signal list, internal condition list, etc., transitions the power state from the second state 204 to a third state 206. A second exit condition, specified by a signal list, internal condition list, etc., transitions the power state from the second state 204 to an nth state 208. Any of the states 202-208 can transition to an error state 210 based on one or more error conditions including timeout or PGOOD, thermal error, current, voltage, etc. Thus, error condition(s) trigger a procedure/sequence in the state diagram 200 to maintain safe operation of the state in the error or safe state 210. States 202-210 can also transition to an off state 212 as shown in the example of FIG. 2.

In certain examples described herein, power states 202-208 can be sequenced to bring different voltages online to power a device. As described further below, in certain examples, an embedded device can be protected through synchronous power cycling via the state machine 200. In certain examples, the embedded device is unaware of the synchronous power cycling of a plurality of PMICs according to the finite state machine 200.

Figure 3:
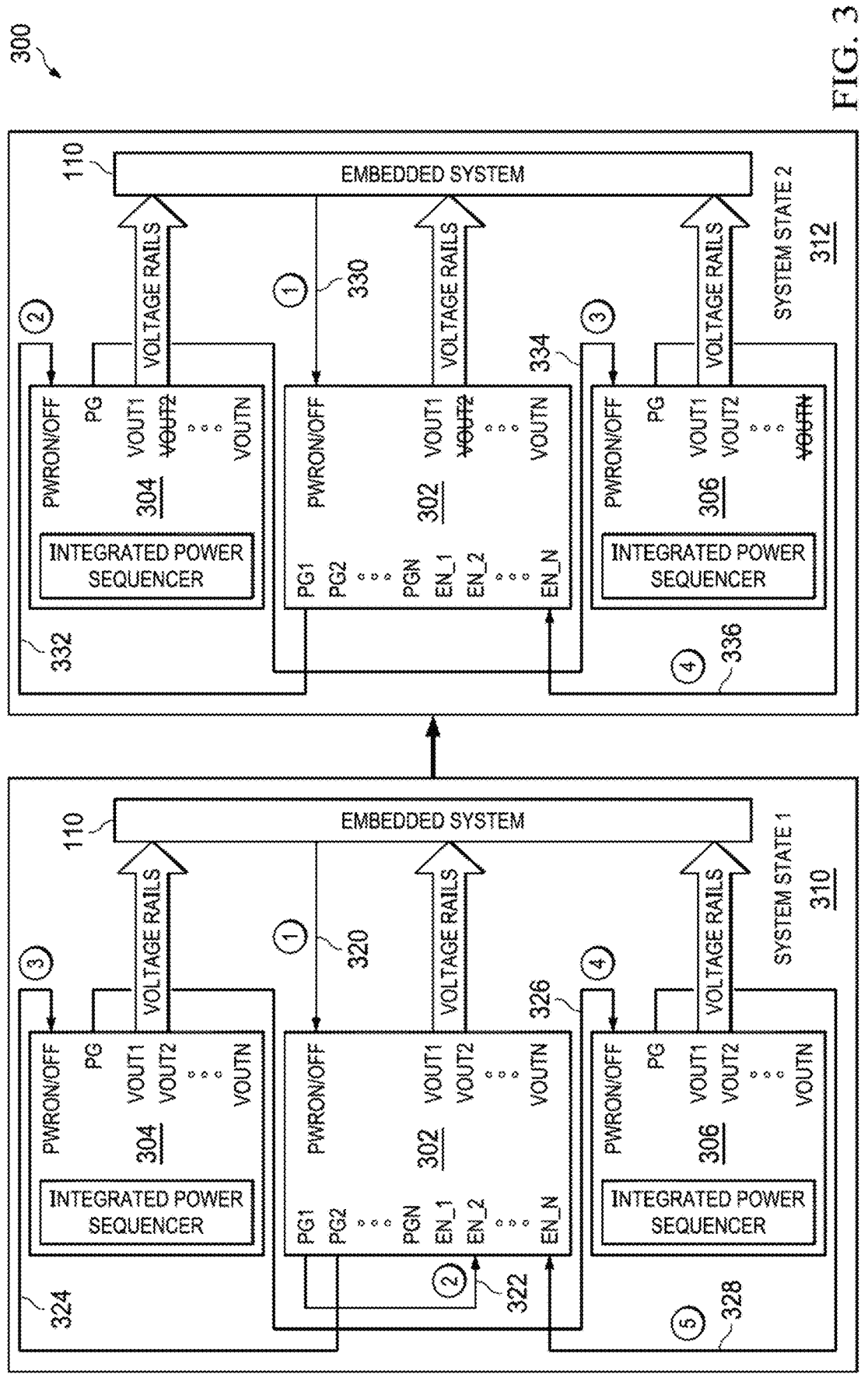
FIG. 3 is an example sequencing of multiple power management circuits from a first state to a second state.

FIG. 3 illustrates an example sequencing 300 of multiple PMICs 302, 304, 306 with the embedded system 110 from a first state 310 to a second state 312. As shown in the example of FIG. 3, the embedded system 110 triggers 320 a first PMIC 302, which has a first of its PGOOD outputs tied 322 to an enable input of the first PMIC 302. A second PGOOD output of the PMIC 302 activates 324 the second PMIC 304. A PGOOD output from the second PMIC 304 activates 326 the third PMIC 306, and a PGOOD output from the third PMIC 306 provides 328 an enable input for the first PMIC 302. Thus, in the first state 310, the PMICs 302-306 use individual enable signals, and regulators are linked using PGOOD output of one PMIC 302-306 connected to the enable input of a next PMIC 302-306 in sequence.

However, in low-power state(s) in which the embedded system 110 (e.g., an SoC, etc.) is turned off, the sequence 300 may not be able to implement power management control on the embedded system 110. Additionally, separate sequencers increase system size and cost, and a large number of rails for power requires many pins to control the rails. Further, use of enable signals leaves the system unaware of errors occurring during the sequence. Using linked PMIC regulators 302-306, simple sequences can be implemented, but branches or conditional sequences are difficult to implement and can require external glue logic to facilitate. Controlling rails using a sequencer monitoring PGOODs and/or output voltages involves a large number of I/O pins from the sequencer, for example. With the large number of I/O pins comes an increased footprint, more control messages, more load on the embedded system 110, and more opportunities for failure, for example.

In the example state 2 312, the embedded system 110 activates or turns on 330 the PMIC 302, which activates 332 the PMIC 304 via a PGOOD output of the PMIC 302. The PMIC 306 is activated 334 based on the PGOOD output of the PMIC 304. The PGOOD output of the PMIC 306 feeds back into the enable input of the PMIC 302, for example.

Thus, a power state may refer to a combination of on/off functionality in the PMIC or the PMIC system. Depending on the power state, some or all power regulators of the PMICs can be on (active) or off. For example, in a low power state, some regulators are off, while all regulators are on in an activate state. Each power state is associated with certain voltages and a certain processor state to execute all, part, or none of the processor's functionality. As shown in the example of FIG. 3, each PMIC 302-306 communicates separately with the embedded system 110. Each PMIC 302-306 then needs its own interface to communicate with the embedded system 110 and saves instructions, configuration, etc., for interaction with the embedded system 110. Such a configuration involves heavy use of resources, establishment of infrastructure, and opportunity for failure with multiple PMICs 302-306 communicating with and receiving instruction from the same embedded system, for example.

Instead, certain examples provide multiple, synchronized integrated PMICs forming an aggregate PMIC viewed by an associated SoC or other embedded system as a single effective PMIC. Using the integrated PMIC, power state information is shared among the main PMIC and one or more satellite PMICs forming the aggregate PMIC. An integrated control scheme allows the main PMIC to interface with the embedded system and coordinate among the satellite PMICs via an integration interface, while each included PMIC provides power to the embedded system according to the power state.

Using an integrated control scheme, the embedded system interacts with a single PMIC via a single interface, regardless of whether one, two, five, ten, twenty, etc., PMICs are providing power to the embedded system. The single PMIC acts as a primary PMIC and other connected PMICs are treated as secondary PMICs masked by the primary PMIC from the viewpoint of the embedded system such that the embedded system thinks it is interacting with only one PMIC. The aggregate PMIC can support a plurality of power states and complex transitions between power states via a plurality of satellite PMICs taking direction from the main PMIC. The aggregated, integrated set of PMICs is transparent to the host embedded system, allowing partitioning of power management functions into any desired number of smaller PMICs while enabling fully synchronous operation of all connected PMICs. The aggregated control scheme supports diagnostics and functional safety monitoring of the embedded system inside the fault-tolerant time of the embedded system and does not require an external sequencer or glue logic. Thus, certain examples enable circuitry, control, and associated power solutions that can be optimized and/or otherwise improved for high/mid/low end variants of a processor family for cost and size scaling, etc.

Figure 4:
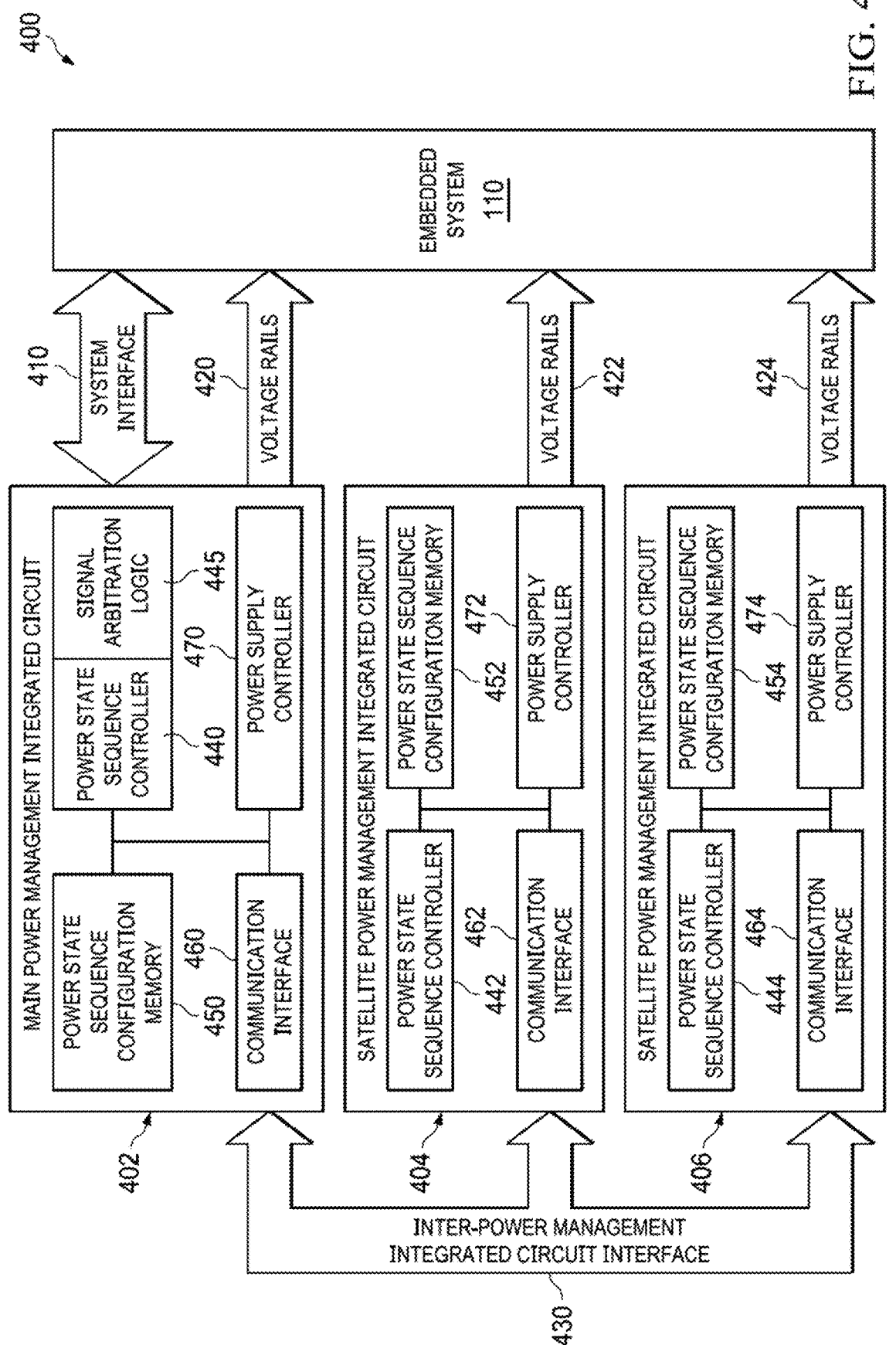
FIG. 4 is a schematic illustration of an example aggregated power management apparatus including a main or primary power management circuit and one or more secondary or satellite power management circuits.

FIG. 4 illustrates an example aggregated PMIC system 400 including a main or primary PMIC 402 as well as one or more satellite or secondary PMICs 404, 406. A system interface 410 connects the main PMIC 402 with the embedded system 110 (e.g., an SoC, other processor circuitry, etc.). Voltage rails 420-424 connect all PMICs 402, 404, 406 to the embedded system 110. An inter-PMIC interface 430 connects the satellite PMICs 404, 406 to the main PMIC 402 and to each other for bi-directional exchange of data, instructions, state information, and/or other messages, etc.

The primary or main PMIC 402 includes a power state sequence controller 440 that monitors power state and embedded system 110 operation, settings, state, etc., and controls the aggregate PMIC 400 according to an integrated power state control scheme. The power state sequence controller 440 works with signal arbitration logic 445 to prioritize and/or otherwise meter incoming signals (e.g., power state control signals such as an activate signal, a sleep signal, a reset signal, an error tracking signal, etc.) from the embedded system 110. Satellite or secondary PMICs 404-406 also include power state sequence controllers 442, 444 to execute a power state sequence such as in accordance with instructions from the primary PMIC 402. The power state sequence controllers 440-444 operate according to a power state sequence configuration stored in respective memories 450-454. Each PMIC 402-406 includes a communication interface 460-464 to communicate with other PMICs 402-406 in the integrated group via the inter-PMIC interface 430 to send and receive power state information, etc. Each PMIC 402-406 includes a power supply controller 470-474 that controls and monitors the output voltage rails 420-424 associated with each respective PMIC 402-406 to apply a voltage for power to all or part of the embedded system 110. The power supply controllers 470-474 work with respective power state sequence controllers 440-444, using information communicated via respective interfaces 460-464 and/or stored in respective memories 450-454 to control and monitor the respective PMIC's output rails 420-424 to provide power to the system 110 according to a power state and/or other instruction, for example. Each PMIC 402-406 can operate in concert with each other as an aggregate PMIC and/or can operate separately without regard to other devices 402-406, for example.

The primary PMIC 402 controls the host system interface 410 and collects and distributes power state information to connected PMICs 404, 406 using the inter-PMIC communication interface 430. The primary PMIC 402 also monitors errors reported by the component PMICs 404-406 and conveys the error information via the system interface 410 to the embedded system 110, for example. Synchronizing the power state information at the primary PMIC 402 avoids having to communicate detailed information about each regulator's timing and operation between the PMICs 404-406, making implementation robust and simple. Since less data is being transmitted among the PMICs 402-406 and between the PMICs 402-406 and the embedded system 110, the aggregate PMIC operates fast enough to meet Fault Tolerant Time of a functional safety system.

The example system/apparatus configuration 400 of FIG. 4 provides a scalable power management solution with the main or primary PMIC 402, alone or in conjunction with one or more secondary or satellite PMICs 404, 406 to provide power to the embedded system 110 via a constant system interface 410 managed using power state synchronization. The system interface 410 provides stable, constant communication between the SoC and/or other embedded system 110 and the main PMIC 402 for power management and delivery. Each PMIC 402-406 includes its own power regulation, internal sequencing, and monitoring via a respective power state sequence controller 440-444, power state sequence configuration memory 450-454, communication interface 470-474, and power supply controller 470-474, for example. The inter-PMIC interface 430 enables synchronization of power state information between the PMICs 402-406.

Using such a composite or aggregate PMIC 400, there is no change to the system interface 410 or associated software when the power solution is scaled (e.g., to add or remove secondary PMIC 404-406, etc.). Secondary PMICs 404-406 are masked by the primary PMIC 402 such that the embedded system 110 may, in some examples, only communicate with the primary PMIC 402 regardless of whether or how many secondary PMICs 404-406 are connected with the primary PMIC 402. Thus, power management components 404-406 can easily be added or removed according to power level requirements for the embedded system 110. In certain examples, the inter-PMIC interface 430 is a low-bandwidth interconnect providing minimal messaging to synchronize the PMICs 402-406. Alternatively or in addition, the system interface 410 provides a low-bandwidth interconnect to convey power needs and/or other control and/or error information between the embedded system 110 and the main PMIC 402, for example. Each individual PMIC 402-406 is capable of stand-alone operation, and the aggregate provides a scalable, functional, safety power system 400, for example.

Certain examples provide a finite state control scheme in conjunction with multiple PMIC 402-406 organized to appear as a single PMIC 400 to the embedded system 110. System state, sleep and wake-up control signals are communicated between the embedded system 110 and the PMIC apparatus/device 400. Information is compiled by the primary PMIC 402, and power state information is synchronously communicated to the attached satellite PMICs 404-406 via the interface 430 (e.g., a system power management interface (SPMI) communication bus, etc.). Errors can be reported back to the embedded system 110. With the build-in diagnostics and functional safety monitoring protocol of the inter-PMIC communication, the control scheme of FIG. 4 enables the embedded system 110 to respond to power supply fault conditions within the fault-tolerant time of the system 110. This enables the apparatus 400 and its embedded system 110 to target an automotive safety integrity level D (ASIL-D) safety level for automotive applications, a safety integrity level three (SIL-3) for industrial applications, etc.

In certain examples, inter-PMIC communication can be implement as few as two digital input/output pins from each PMIC device 402-406. Pins can include a clock pin (SCLK pin) going from the master PMIC 402 to all the satellite PMICs 404-406. Pins can include a data pin (SDATA pin) enabling bi-directional data transfer between the master PMIC 402 and the satellite PMICs 404-406. The data pin signal allows the master PMIC 402 to communicate the state of the system (Active, Sleep, StandBy, Safe, Off, etc.) to the satellite PMICs 404-406, and receive acknowledgement and error checking (e.g., cyclic redundancy check (CRC), etc.) information back from the satellite PMIC(s) 404-406. The data pin signal also allows the satellite PMICs 404-406 to communicate error conditions to the master PMIC 402. The error signal notifies the master PMIC 402 to take action if an error occurs during the execution of the power sequencing. The number and description of the interface pins above illustrates only one example implementation. The same function can be achieved with other interfaces.

Figure 5:
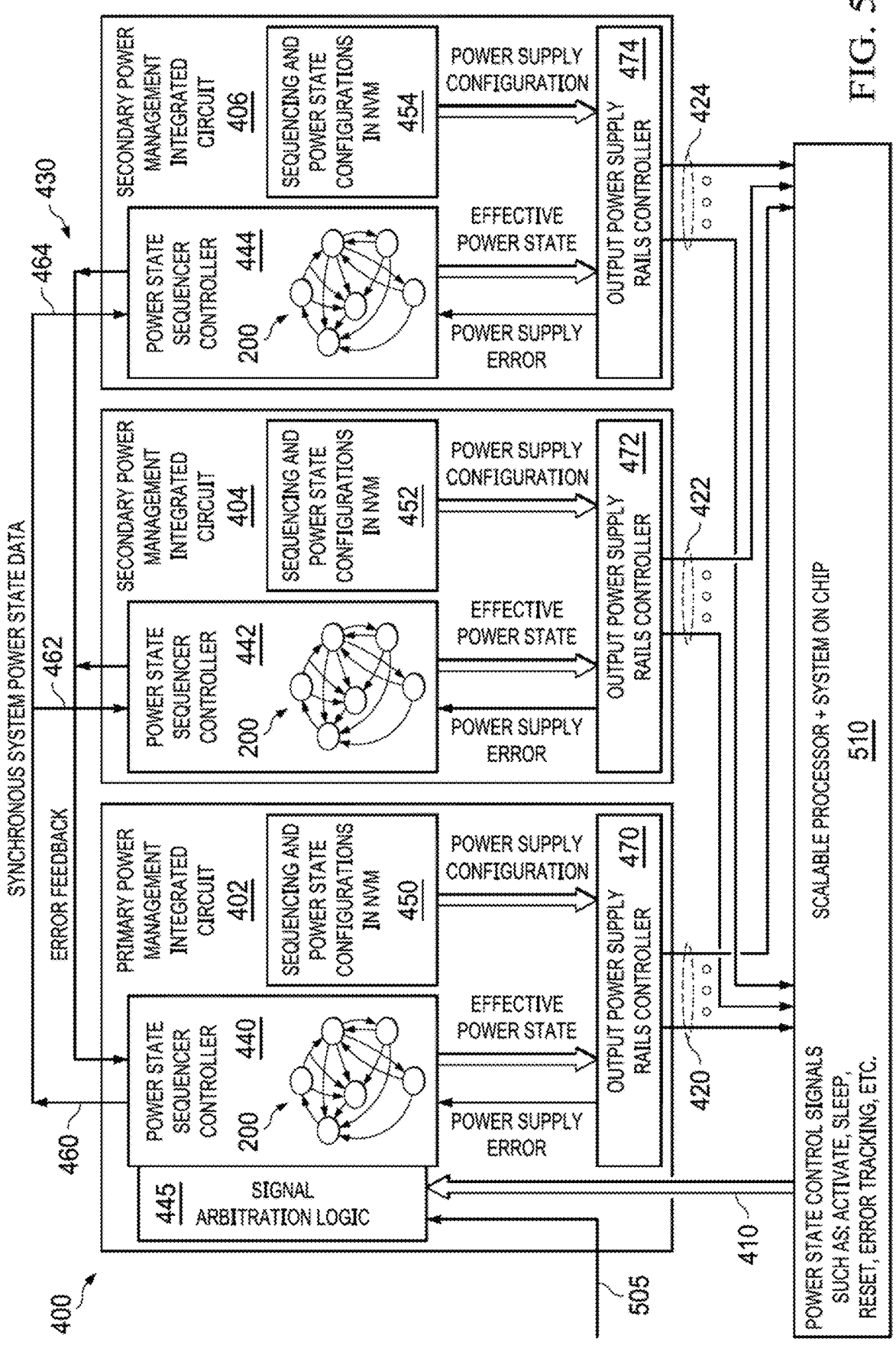
FIG. 5 is an example implementation of the apparatus of FIG. 4 connected to power a scalable processor with a system on a chip.

FIG. 5 illustrates an example implementation of the apparatus 400 connected to power a scalable processor with a system on a chip (SoC) 510. As shown in the example of FIG. 5, an external input 505 powers on, wakes up, or otherwise enables the primary PMIC 402. The external input 505 (e.g., an external hardware input from a power supply, controller, etc.) powers on the PMIC 402 to set the scalable processor/SoC 510 to an initial power-up state and to begin the process of powering on secondary PMIC(s) 404-406 from the primary PMIC 402 to provide power to the scalable processor/SoC 510. The primary PMIC 402 can begin communicating with the scalable processor/SoC 510 in the initial power-up state and as the secondary PMICs 404-406 are being powered and/or can await power-up of the secondary PMICs 404-406 before querying the scalable processor/SoC 510 for power state information, for example.

The scalable processor/SoC 510 provides power state control signals such as an activate signal, a sleep signal, a reset signal, an error tracking signal, etc., via the system interface 410 to the primary PMIC 402. The signal arbitration logic 445 receives and processes the power state control signals at the primary PMIC 402. The signal arbitration logic 445 determines a power state and/or impact of the received control signal(s) (and/or corresponding instructions) on the current power state and provides an outcome of the logic to the power state sequence controller 440. The power state sequence controller 440 generates an effective power state for the output power supply rails controller 470 of the primary PMIC 402 and also provides synchronous system power state data on the inter-PMIC interface 430 to the secondary PMICs 404, 406 (e.g., according to a power sequence state machine such as the finite state machine 200 of the example of FIG. 2). Sequencing and power state configuration information from the non-volatile memory 450 can be provided to the output power supply rails controller 470 to drive the voltage rails output 420 based on the power state data from the controller 440. For example, the power state sequence can trigger activation of rail sets 420-424 according to a desired power state to power all or part of the scalable processor/SoC 510. If an error occurs in the output, the output power supply controller 470 generates a power supply error for the power state sequence controller 440, for example.

Each secondary PMIC 404-406 receives the synchronous power state data via their communication interface 462-464 and provides the data to its respective power state sequence controller 442-444. For example, the communication interfaces 462-464 receive, from the primary PMIC 402, a power state and/or sequence indication to leverage their copy of the state machine 200 with their corresponding power state sequence controller 442-444. Each power state sequence controller 442-444 generates an effective power state for a respective output power supply rails controller 472-474 to drive respective voltage rail outputs 422-424. Based on the effective power state, a power supply configuration is retrieved from the sequencing and power state configurations stored in memory 452-454, for example. Power supply error can be provided back to the power state sequence controller 442-444, and error feedback can be provided by the secondary PMIC 404-406 via the interface 430 to the power state sequence controller 440 of the primary PMIC 402, for example.

Figure 6:
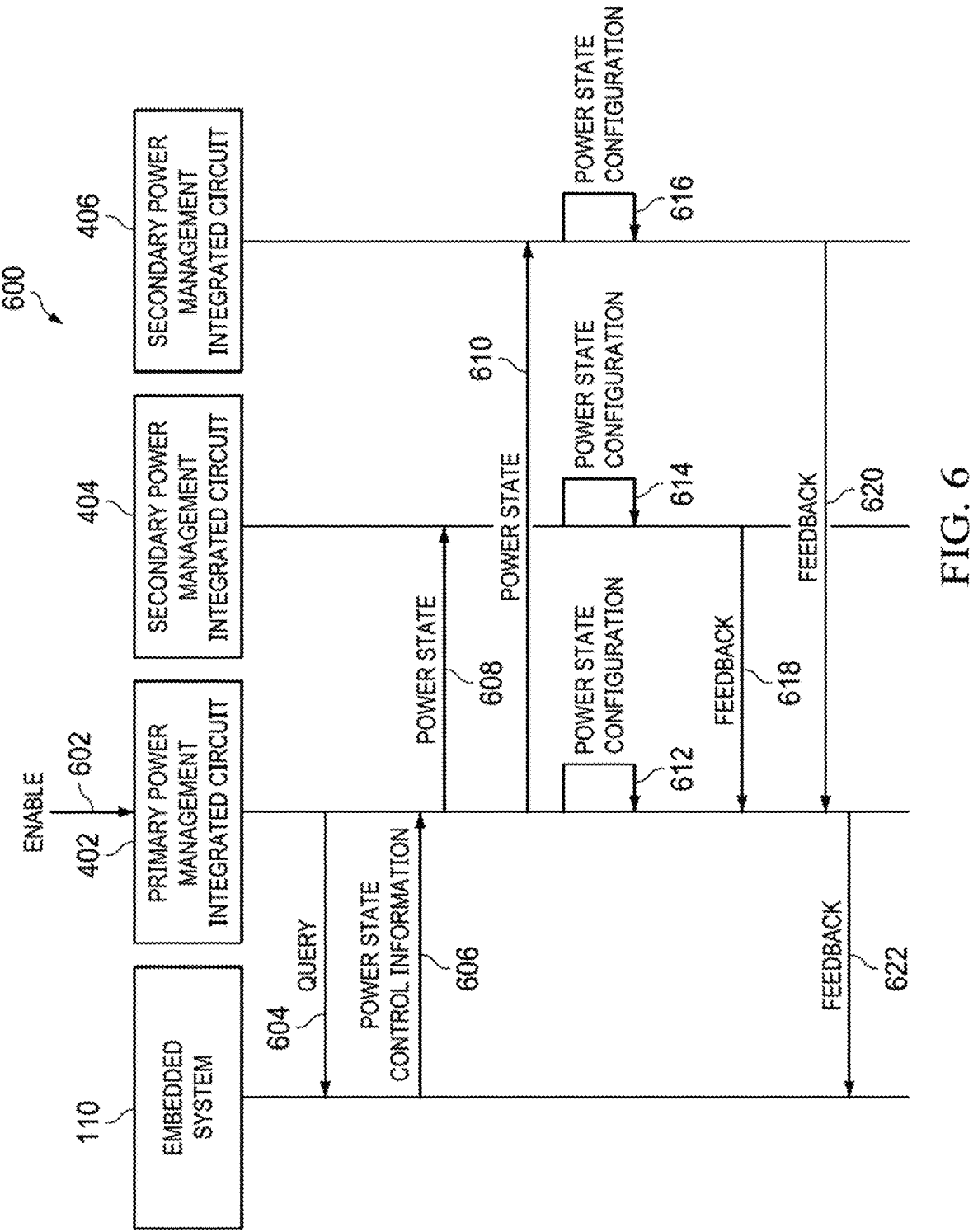
FIG. 6 is an example data flow to provide power from an aggregate power management apparatus to an embedded system.

FIG. 6 illustrates an example data flow 600 among the embedded system 110, the primary PMIC 402, and the secondary PMIC 404, 406 to provide power from the aggregate PMIC 402-406 to the embedded system 110. At 602, an external signal (e.g., external hardware, firmware, etc.) enables or activates the primary PMIC 402 (e.g., in an initial power state, etc.). For example, the initial power state provides power to the primary PMIC 402 and allows it to begin an initial power up of the embedded system 110 to enable the embedded system 110 to respond to the primary PMIC 402. At 604, the primary PMIC 402 queries or wakes the embedded system 110 to receive power state information. For example, the initial power up of the embedded system 110 allows the embedded system 110 to receive and process a query and/or other message from the primary PMIC 402 and respond. At 606, the embedded system 110 provides updated power state information to the primary PMIC 402. For example, the embedded system 110, which may be in an initial power-up state, can provide a power state change request to the primary PMIC 402 to adjust power being provided to the embedded system 110 beyond the initial power-up state. At 608 and 610, the primary PMIC 402 communicates the power state information to the secondary PMICs 404, 406, respectively.

At 612-616, the primary PMIC 402 and secondary PMICs 404-406 simultaneously (or substantially simultaneously given data transmission and processor execution latency, etc.) configure themselves for the new power state (e.g., according to the sequencing and power state configuration programmed in their NVM 450-454) and execute in synchrony the power sequence to transition to the new power state. At 618-620, the secondary PMICs 404-406 can provide feedback regarding the status of power state configuration and voltage rail output monitor results to the primary PMIC 402. At 622, the primary PMIC 402 can provide feedback regarding the status of power state configuration and voltage rail output monitor results to the embedded system 110. The data flow can continue with additional power state control information 606 provided by the embedded system 110 to the primary PMIC 402, for example.

Figure 7:
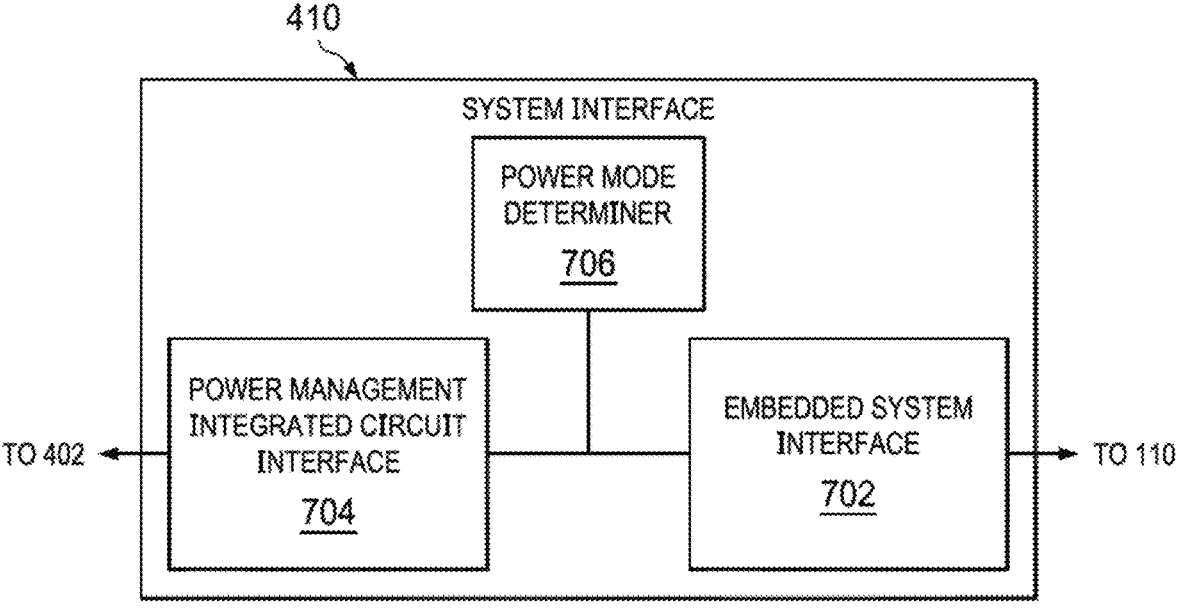
FIG. 7 illustrates an example implementation of the system interface of FIGS. 4-5.

FIG. 7 illustrates an example implementation of the system interface 410 described above in connection with FIGS. 4-5. The example system interface 410 can be implemented as part of the embedded system 110, as part of the PMIC 402, and/or as a separate circuit between the embedded system 110 and the primary PMIC 402. As shown in the example of FIG. 7, the system interface 410 includes an embedded system interface 702, a PMIC interface 704, and a power mode determiner 706.

The embedded system interface 702 is connected to and/or incorporated with the embedded system 110 and facilitates exchange of control signals, feedback, error notification, settings, etc., with the embedded system 110. Similarly, the PMIC interface 704 is connected to and/or incorporated with the primary PMIC 402 and facilitates exchange of control signals, feedback, error notification, settings, etc., with the primary PMIC 402. The power mode determiner 706 can be incorporated in the primary PMIC 402, the embedded system 110, or implemented as a separate embedded system interface 702 circuit connecting the embedded system 110 and the primary PMIC 402, for example. Thus, the system interface 410 utilizes the embedded system interface 702 and the PMIC interface 704 to exchange commands, feedback, error signals, settings data, and/or other control signals (e.g., active, sleep, reset, error, power level, etc.) between the embedded system 110 and the primary PMIC 402.

The power mode determiner 706 takes input from the embedded system 110 (e.g., power control signals, etc.) and/or the primary PMIC 402 (e.g., power state and/or other operational feedback, error codes, etc.) and determines a desired power state or mode for the aggregate PMIC 400 to support the embedded system 110 (e.g., on, off, low power, high power, sleep, etc.). Power mode information can be relayed between the embedded system 110 and the primary PMIC 402 via the system interface 410, for example.

In some examples, the embedded system 110 may set a bit of a register based on a desired power state or level. In such examples, the power mode determiner 706 of the system interface 410 reads the value stored in the register to determine a power state or output power level to instruct the primary PMIC 402. The register may be located in the embedded system 110 and/or in the example system interface 410, for example.

While example implementations of the apparatus 400 are illustrated in FIGS. 4-7, one or more of the elements, processes and/or devices illustrated in FIGS. 4-7 can be combined, divided, re-arranged, omitted, eliminated and/or implemented in any other way. Further, the example embedded system 110, PMICs 402-406, example system interface 410, example voltage rails 420-424, example inter-PMIC interface 430, example power state sequence controllers 440-444, example signal arbitration logic 445, example power state sequence configuration memories 450-454, example communication interfaces 460-464, example power supply controller 470, example embedded system interface 702, example PMIC interface 704, example power mode determiner 706, and/or more generally the example PMIC apparatus 400 of FIGS. 4-7 can be implemented by hardware, software, firmware and/or any combination of hardware, software and/or firmware. Thus, for example, any of the example embedded system 110, PMICs 402-406, example system interface 410, example voltage rails 420-424, example inter-PMIC interface 430, example power state sequence controllers 440-444, example signal arbitration logic 445, example power state sequence configuration memories 450-454, example communication interfaces 460-464, example power supply controller 470, example embedded system interface 702, example PMIC interface 704, example power mode determiner 706, and/or more generally the example PMIC apparatus 400 of FIGS. 4-7 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). In some examples, at least one of the example embedded system 110, PMICs 402-406, example system interface 410, example voltage rails 420-424, example inter-PMIC interface 430, example power state sequence controllers 440-444, example signal arbitration logic 445, example power state sequence configuration memories 450-454, example communication interfaces 460-464, example power supply controller 470, example embedded system interface 702, example PMIC interface 704, example power mode determiner 706, and/or more generally the example PMIC apparatus 400 of FIGS. 4-7 may include a non-transitory computer readable storage device or storage disk such as a memory, a digital versatile disk (DVD), a compact disk (CD), a Blu-ray disk, etc. including the software and/or firmware. Further still, the example embedded system 110, PMICs 402-406, example system interface 410, example voltage rails 420-424, example inter-PMIC interface 430, example power state sequence controllers 440-444, example signal arbitration logic 445, example power state sequence configuration memories 450-454, example communication interfaces 460-464, example power supply controller 470, example embedded system interface 702, example PMIC interface 704, example power mode determiner 706, and/or more generally the example PMIC apparatus 400 of FIGS. 4-7 can include one or more elements, processes and/or devices in addition to, or instead of, those illustrated in FIGS. 4-7, and/or may include more than one of any or all of the illustrated elements, processes and devices.

Figure 8:
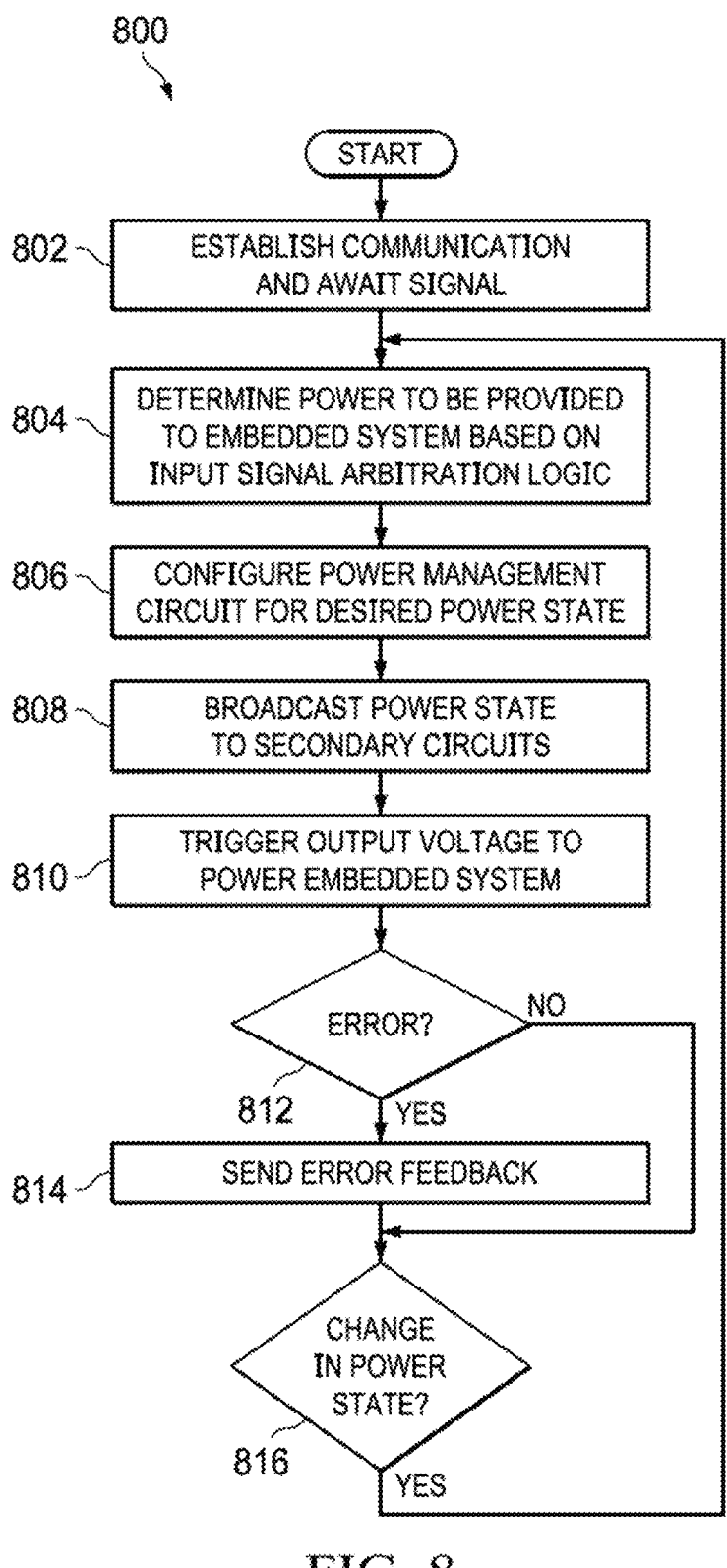
FIG. 8 is a flowchart representative of example machine readable instructions that may be executed to implement/operate the example system interface to instruct and/or otherwise control the power management circuitry of FIGS. 4-5 to power an embedded device.

A flowchart representative of example machine readable instructions for implementing, programming, and/or controlling the aggregate PMIC apparatus 400 (e.g., via the example system interface 410, etc.) of FIGS. 4-7 is shown in FIG. 8. In this example, the machine readable instructions comprise a program for execution by a processor such as the processor 918 shown in the example processor platform 900 discussed below in connection with FIG. 9. The program may be embodied in software stored on a non-transitory computer readable storage medium such as a CD-ROM, a floppy disk, a hard drive, a digital versatile disk (DVD), a Blu-ray disk, a flash drive, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 8, many other methods of implementing, programming, and/or controlling the aggregate PMIC apparatus 400 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example process of FIG. 8 can be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). The term non-transitory computer readable medium may include any type of computer readable storage device and/or storage disk and may exclude propagating signals and transmission media.

FIG. 8 is an example flowchart 800 representative of example machine readable instructions that may be executed to implement and/or operate the example system interface 410 to control the example PMIC apparatus 400 of FIGS. 4-7 to power the embedded system 110. Although the instructions of FIG. 8 are described in conjunction with the example apparatus 400 of FIGS. 4-7, the example instructions may be utilized by any interface circuitry to instruct and/or control power management circuitry to power an embedded device.

At block 802, communication is established between the primary PMIC 402 and the embedded system 110 and an input signal is awaited. For example, the system interface 410 and/or other connection 505 facilitates transmission of an activate signal, a power on signal, an enable signal, and/or other initialization signal from an external resource (e.g., a power supply, external controller, and/or other external hardware, etc.) to the primary PMIC 402 to enable the PMIC 402 to provide power to the embedded system 110. A received control signal can be processed by the signal arbitration logic 445, and multiple signals can be arbitrated by the signal arbitration logic 445 to determine which control signal receives priority to control the PMICs 402-406. As part of establishing communication, the primary PMIC 402, which can be enabled via an external source, can provide an initial power-up state at the embedded system 110 to allow the embedded system 110 to communicate with the primary PMIC 402 via the system interface 410. This initial power-up level can be a default mode or state of the primary PMIC 402 once it is enabled 602, for example. Once the embedded system 110 has an initial level of power, a change in power state can be requested by the embedded system 110 to the primary PMIC 402, for example.

At block 804, power to be provided to the embedded system 110 is determined by the primary PMIC 402. For example, the PMIC 402 evaluates power state control information from the embedded system 110 (e.g., via the power mode determiner 706 of the system interface 410, etc.) to determine a desired and/or other target power state for the PMICs 402-406 to drive the voltage rails 420-424 to power the embedded system 110.

At block 806, the primary PMIC 402 is configured with a power supply configuration to accommodate the power request from the embedded system 110 for a desired power state based on selection of a predefined power sequence. For example, based on the determined power state from the power state sequence controller 440 of the primary PMIC 402, a power sequence or other power supply configuration is retrieved from memory 450 to configure the output power supply rails controller 470 to drive the voltage rail(s) 420 to provide power to the embedded system 110.

At block 808, power state information is broadcast by the primary PMIC 402 to the secondary PMICs 404-406. For example, the primary PMIC 402 leverages the inter-PMIC interface bus 430 to provide power state data from the primary PMIC 402 to the secondary PMICs 404-406. Thus, the primary PMIC 402 interfaces and communicates with the embedded system 110 while the secondary PMICs 404-406 receive information from the primary PMIC 402 but still contribute to powering the embedded system 110, for example.

At block 810, an output of voltage by power supply(-ies) associated with the PMICs 402-406 is triggered to provide the embedded system 110 with power. For example, the output power controllers 470-474 are triggered according to power state and associated sequence specified by the power state sequence controller 440-444 and power state sequence configuration in memory 450-454.

At block 812, an error in power operation of the PMIC 402-406 is determined. That is, one or more of the primary and secondary PMICs 402-406 determine whether there is an error in their respective power operation. For example, the output power supply rail controllers 470-474 can evaluate effective power output on the respective voltage rails 420-424 in comparison to a requested or desired output. The power state sequence controllers 440-444 can evaluate power state transition, desired power state, etc., to identify an error, for example. The communication interface 460-464 can identify an error in communication with respect to the interface 430 and PMICs 402-406, for example.

At block 814, if an error was detected, then error feedback is sent to the PMIC 402. Thus, the primary PMIC 402 has possession of its own feedback, and error feedback from the secondary PMIC 404-406 is sent to the primary PMIC 402 for analysis, propagation, repair, adjustment, modification, etc. For example, the primary PMIC 402 and its power state sequence controller 440 can collect, process, and/or otherwise organize feedback from the PMIC 402-406 to respond to the feedback and/or to provide feedback to the embedded system 110.

At block 816, a change in power state is determined by the primary PMIC 402. For example, the error feedback can trigger an adjustment in the power state and/or other configuration setting. Alternatively or in addition, the embedded system 110 can transmit an updated power control signal to the primary PMIC 402. If a change in power state is identified (e.g., a new/updated signal from the embedded system 110 to the primary PMIC 402 via the system interface 410, etc.), then, control reverts to block 804 to determine an updated power supply configuration based on the change in power state.

Thus, certain examples provide flexible power to a variety of embedded applications and/or other processors. Certain examples enable scalable power and state sequencing based on connected device and system configuration, etc. Certain examples enable adaptive power management through power state sequencing and other configuration stored in memory by one or more PMICs and responsive to control signal(s) from the embedded device. Certain examples provide a composite or aggregate effective PMIC providing PMIC benefits of scalability and flexibility traditionally associated with discrete power regulator integrated circuits (which require much additional dedicated circuitry for reference, regulation, comparison, glue logic, etc.).

In certain examples, the primary PMIC 402 receives control signals from the embedded system 110 via the interface 410 and uses a single enable signal to generate a plurality of power supply domains with sequencing via power states, stored configuration information, and inter-PMIC interface relay 430. Output voltages and current can be regulated, and individual satellite PMICs 404-406 can be enabled or disabled depending on power requirements, settings, etc.

In certain examples, highly integrated PMICs 402-406 reduce occupied circuit board space and an associated high switching frequency further reduces external component size. Power state sequencing and output voltages can be fully configurable via the primary PMIC 402 based on the aggregate of the primary and secondary PMICs 402-406. Power can be scaled and applied in pulse frequency modulation (PFM) and/or pulse width modulation (PWM) to enable high efficiency over a wide output current (Iout) range. Further, robust monitoring of output voltage/current helps to mitigate failures. Applications can include infotainment, head-up display/head unit, instrument cluster, telematics, radar, etc.

For example, the PMICs 402-406 can be implemented in a switching converter (e.g., buck converter, dual buck converter, dual buck converter with dual low-dropout regulator, etc.) and the like, to be used in automotive applications to step down voltage (and corresponding step up current) from its input (supply) to its output (load). The converter PMICs 402-406 can drive an embedded processor, SoC, etc., to provide power, precise voltage regulation, etc., for low voltage (e.g., 3.3V, 5V, etc.) operation of an automotive infotainment device (e.g., touchscreen display, Bluetooth™ smartphone interface, etc.), automotive instrument cluster, automotive head-up display, automotive universal serial bus (USB) charger, etc. Depending upon a number of active automotive systems (e.g., a media player, a rear-view camera, a touchscreen display, a USB charger, an illuminated instrument panel, etc.), one or more secondary PMICs 404-406 can be activated to support the primary PMIC 402 in delivering power to vehicle systems.

The plurality of PMIC 402-406 function as an aggregate or "black box" power management apparatus 400, appearing to the embedded device 110 as a single PMIC. Each PMIC 402-406 can include battery management, voltage regulation, and charging functions, for example. The PMICs 402-406 can include a direct current (DC) to DC converter to allow dynamic voltage scaling. The PMICs 402-406 can integrate with dynamic frequency scaling to provide dynamic voltage and frequency scaling (DVFS), for example. The PMICs 402-406 can include a low-dropout regulator (LDO) and a real-time clock (RTC) co-operating with a backup battery, for example. The PMICs 402-406 can use pulse-frequency modulation (PFM) and pulse-width modulation (PWM) and can include a switching amplifier (e.g., Class-D electronic amplifier, etc.), for example. Such power management can also be applied to personal electronics, industrial automation, sensor fusion systems, etc.

Figure 9:
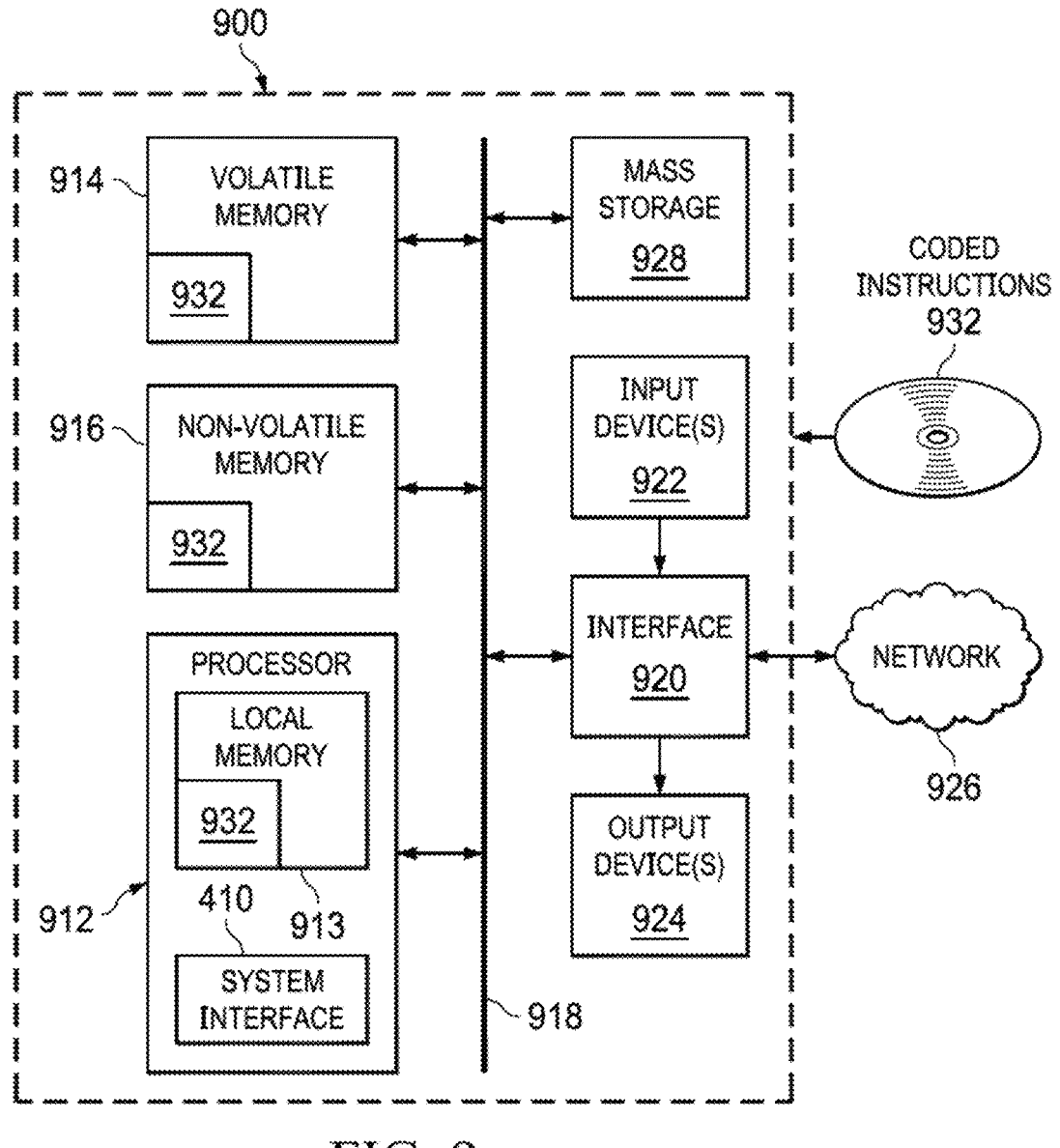
FIG. 9 is a block diagram of a processor platform structured to execute the example machine readable instructions of FIG. 8 to control the example system interface of FIGS. 7.

FIG. 9 is a block diagram of an example processor platform 900 capable of executing the instructions of FIG. 8 to implement the example system interface 410 and/or other part of the example apparatus 400 of FIGS. 4-7. The processor platform 900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, an automotive microcontroller unit (MCU), industrial control unit, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The hardware processor may be a semiconductor based (e.g., silicon based) device. In this example, the processor implements the example system interface 410.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memories 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, flash drives, and digital versatile disk (DVD) drives.

The coded instructions 932 of FIG. 8 may be stored in the mass storage device 928, in the volatile memory 914, in the non-volatile memory 916, and/or on a removable tangible computer readable storage medium such as a CD or DVD.

From the foregoing, it will be appreciated that example methods, apparatus and articles of manufacture have been disclosed that provide power management integrated circuits connected via bus and triggered to provide synchronous power to an embedded processor, SoC, and/or other embedded system. Certain examples reduce or minimize communication with the embedded system and provide centralized control and configuration of a plurality of PMICs while presenting a single point of connect to the embedded system. While prior approaches required individual connections between PMICs and the embedded system and individual PMICs that did not coordinate or communicate with each other, certain examples provide a primary PMIC communicating with the embedded system and coordinating one or more secondary PMICs to synchronously provide power to the embedded system.

Although certain example methods, apparatus and articles of manufacture have been described herein, other implementations are possible. The scope of coverage of this patent is not limited thereto. On the contrary, this patent covers all methods, apparatus and articles of manufacture fairly falling within the scope of the claims of this patent.

What is claimed is:

1. A method comprising:
receiving, by a first power management circuit, an enable signal;
querying, by the first power management circuit, an embedded system for power state information indicating a requested power state of the embedded system in response to the receiving the enable signal;
receiving, by the first power management circuit, from the embedded system, a power state control signal indicating the requested power state in response to the querying the embedded system for the power state information;
determining, by the first power management circuit, a first power state for the first power management circuit and a second power state for a second power management circuit based on the power state control signal indicating the requested power state;
transmitting, by the first power management circuit, to the second power management circuit, a signal indicating the second power state;
transitioning, by the first power management circuit, to the first power state to generate a first output power for the embedded system; and
transitioning, by the second power management circuit, to the second power state to generate a second output power for the embedded system based on the signal in synchrony with the transitioning, by the first power management circuit, to the first power state.

2. The method of claim 1, wherein:
the first power management circuit includes signal arbitration logic that processes the power state control signal.

3. The method of claim 2, wherein:
the power state control signal includes multiple activation signals; and
the first power management circuit arbitrates among the multiple activation signals to determine a priority for the multiple activation signals.

4. The method of claim 1, further comprising:
determining, by the first power management circuit, an error based on a difference between the first output power and an effective power output.

5. The method of claim 1, wherein:
the first power management circuit includes a communication interface.

6. The method of claim 5, wherein:
the communication interface is coupled with the second power management circuit.

7. The method of claim 6, wherein:
the communication interface determines a communication error with the second power management circuit.

8. The method of claim 6, further comprising:
transmitting, by the first power management circuit, to the second power management circuit, the signal indicating the second power state via the communication interface.

9. A system, comprising:
a system on a chip (SOC);
a first power supply circuit configured to query the SOC for power state information indicating a requested power state of a set of discrete power states of the SOC; and
a second power supply circuit coupled to the first power supply circuit, wherein:

the SOC is configured to:

provide a power state control signal indicating the requested power state to the first power supply circuit in response to the query;

the first power supply circuit is configured to:

receive the power state control signal indicating the requested power state;

determine a first power state for the first power supply circuit and a second power state for the second power supply circuit based on the power state control signal;

provide a first signal associated with the second power state to the second power supply circuit; and transition to the first power state to generate a first output voltage for the SOC;

the second power supply circuit is configured to:

receive the first signal; and transition to the second power state to generate a second output voltage for the SOC based on the received first signal in synchrony with the transition to the first power state by the first power supply circuit.

10. The system of claim 9, wherein:

the first power supply circuit is further configured to:

determine a third power state for the second power supply circuit, wherein the third power state corresponds to a third output voltage from the second power supply circuit; and provide a second signal associated with the third power state to the second power supply circuit; and the second power supply circuit is configured to:

receive the second signal; and transition from the second power state to the third power state based on the received second signal to generate the third output voltage for the SOC.

11. The system of claim 9, wherein the set of discrete power states includes one or more of: an active state, a sleep state, a standby state, a safe state, or an off state.

12. The system of claim 9, further comprising:

an interface configured to couple the first power supply circuit and the second power supply circuit, wherein the first power supply circuit is configured to provide the first signal to the second power supply circuit through the interface.

13. The system of claim 12, wherein the first power supply circuit is further configured to provide a clock signal to the second power supply circuit through the interface.

14. The system of claim 9, wherein:

the second power supply circuit is configured to:

determine an error associated with the second power supply circuit; and provide a fourth signal associated with the error to the first power supply circuit; and the first power supply circuit is configured to:

provide a fifth signal to the SOC indicating the error associated with the second power supply circuit based on the fourth signal.

15. The system of claim 9, wherein the SOC includes a processor.

16. The system of claim 9, wherein the first power supply circuit is configured to provide the first output voltage to a first voltage rail of the SOC, and wherein the second power supply circuit is configured to provide the second output voltage to a second voltage rail of the SOC.

17. The system of claim 9, wherein the first power supply circuit is configured to:

receive an enable signal; and transition to an initial power state to generate an initial voltage for the SOC in response to receiving the enable signal; and query the SOC for the power state information in response to the transition to the initial power state.

18. The system of claim 9, wherein the second power supply circuit is configured to provide, to the first power supply circuit, feedback indicating a status of the transition to the second power state, and wherein the first power supply circuit is configured to provide, to the SOC, feedback indicating a status of the transition to the first power state and the status of the transition to the second power state.

19. An apparatus comprising:

a first power management circuit and a second power management circuit coupled to the first power management circuit, the first power management circuit configured to:

receive an enable signal;

transition to an initial power state to provide an initial output power to an embedded system in response to receiving the enable signal;

query the embedded system for power state information indicating a requested power state of a set of discrete power states in response to transitioning to the initial power state;

receive a power state control signal indicating the requested power state from the embedded system in response to querying the embedded system for the power state information;

determine both a first power state for the first power management circuit and a second power state for the second power management circuit based on the power state control signal indicating the requested power state;

transmit a signal indicating the second power state to the second power management circuit in response to determining both the first power state and the second power state based on the power state control signal; and transition to the first power state to provide a first output power to the embedded system in response to transmitting the signal indicating the second power state to the second power management circuit; and the second power management circuit configured to:

transition to the second power state to provide a second output power to the embedded system substantially simultaneously with the transition to the first power state by the first power management circuit.

20. The apparatus of claim 19, wherein the second power management circuit is configured to transmit, to the first power management circuit, feedback indicating a status of the transition to the second power state by the second power management circuit, and wherein the first power management circuit is configured to transmit, to the embedded system, feedback indicating a status of the transition to the first power state by the first power management circuit and indicating the status of the transition to the second power state by the second power management circuit.

* * * * *